Patented Dec. 31, 1929

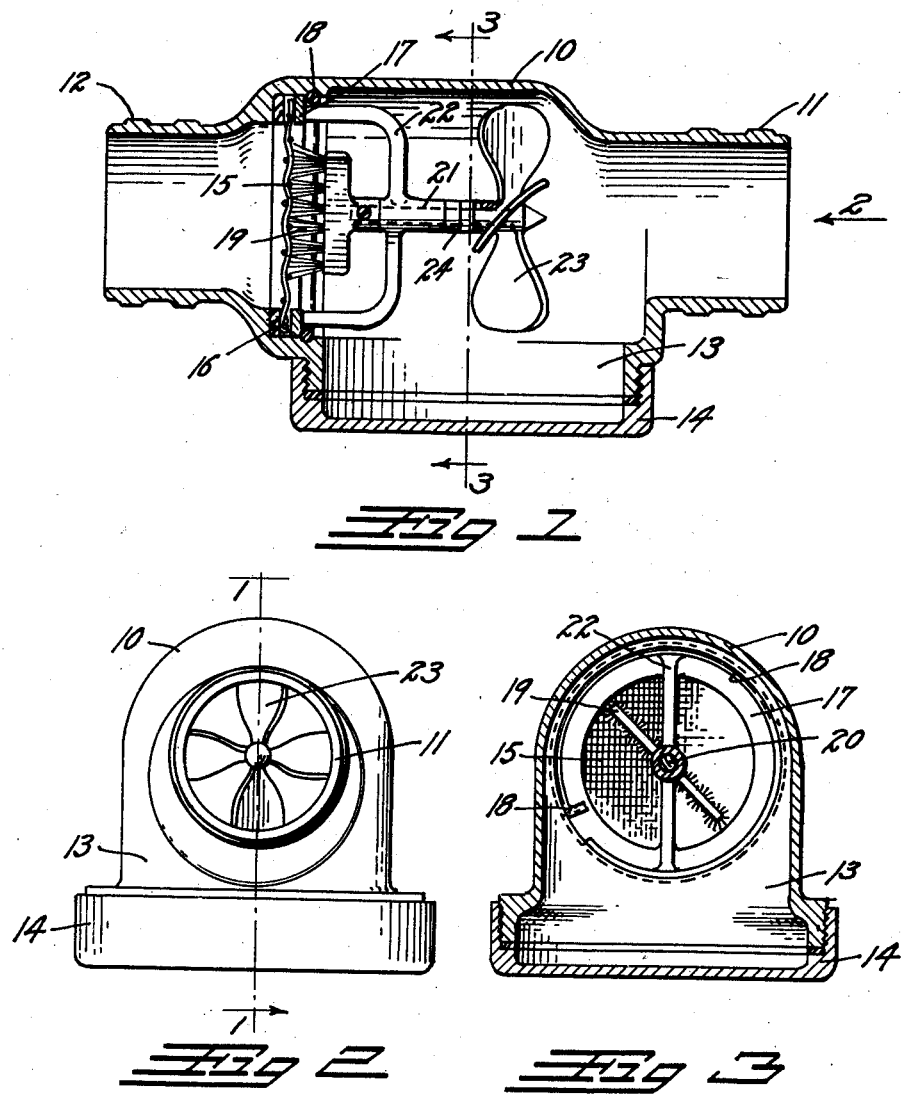

1,741,444

UNITED STATES PATENT OFFICE

JESSE A. SLIDER AND BRUCE S. GOODWIN, OF LAMAR, COLORADO

WATER STRAINER FOR ENGINE-COOLING SYSTEMS

Application filed July 6, 1928. Serial No. 290,858.

This invention relates to a filter or strainer for fluid lines and while particularly designed for straining the cooling water in automobiles and in internal combustion engines, it will be equally valuable in any installation where a strainer is desired to be placed in a conduit for liquid or gases such as in the air lines to pneumatic tools, drills, etc.

The principal object of the invention is to provide a strainer, the screen of which, will be automatically cleaned by the flow of the fluid or gas therethrough.

Another object of the invention is to so construct the device so that the screen and its cleansing mechanism can be quickly and easily removed for inspection or repairs.

A further object is to provide a chamber for the reception of the foreign material that is screened from the passing fluid.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a longitudinal section through the device taken on the line 1—1, Fig. 2.

Fig. 2 is an end view of the device looking toward the intake, in the direction of the arrow "2," Fig. 1.

Fig. 3 is a cross section taken on the line 3—3, Fig. 1.

The device comprises a housing 10, terminating at one extremity in an intake hose nipple 11 and at its other extremity in a similar discharge hose nipple 12. The nipples 11 and 12 are designed to receive the extremities of a cooling water hose between an internal combustion engine and its radiator. They can, however, be replaced by threaded nipples so that the device can be inserted in a pipe line.

The housing 10 is open at its bottom as shown at 13. The opening 13 being closed by means of a suitable sediment cap 14 threaded thereon. The liquid is screened through a screen 15 of any desired mesh. The screen 15 is clamped between a screen ring 16 and a screen frame 17. When in place in the device, the screen 15, ring 16, and frame 17 are held in position by means of a spring wire retaining ring 18 which snaps into a receiving groove within the housing 10 and firmly locks the entire mechanism in place therein.

The screen 15 is constantly kept clear of foreign material by means of a rotating brush 19. The brush 19 is secured to one extremity of a brush shaft 20, carried in a bearing 21 supported on arms 22 projecting from the screen frame 17. The other extremity of the brush shaft 20 carries an impeller 23. The hub of the impeller is separated from the bearing 21 by suitable thrust washers 24.

In operation, the current of fluid enters the nipple 11 and passes the blades of the impeller 23. In passing, it will impart a rotation to the impeller which will be communicated to the brush 19 causing it to rotate against the screen 15. The rotation of the brush acts to constantly remove foreign material from the screen allowing it to fall into a sediment cap 14.

It will be noted that the cross sectional diameter of the flow pipe is materially increased by the housing 10, so that the velocity of the current will be greatly reduced within the housing. This allows any suspended particles of foreign material to settle into the sediment cap 14. At suitable intervals the cap 14 can be removed and cleansed.

The opening 13 is of sufficient size to allow removal of the entire screen and its cleaning apparatus after the retaining ring 18 has been sprung from place.

While a specific form of the improvement has been described and illustrated herein, it is desired to be understood that the same may be varied, within the scope of the appended claims, without departing from the spirit of the invention.

Having thus described the invention, what we claim and desire secured by Letters Patent is:—

1. A strainer for fluid conduits comprising: a housing; a screen within said housing; a frame arranged to maintain said screen in place; a bearing carried by said frame; a shaft mounted in said bearing; a brush carried on one extremity of said shaft in contact with said screen; and an impeller carried on the other extremity of said shaft and adapted to rotate said brush from the flow of said fluid; and a resilient retaining ring adapted to engage a groove in said housing adjacent said frame so as to maintain said frame in place.

2. An automatically cleaned strainer for fluid conduits comprising: a housing; an inlet nipple; an outlet nipple, said inlet and outlet nipples being in alignment with each other at opposite sides of said housing; a screen within said housing in front of said outlet nipple; a brush adapted to brush said screen; a propeller operatively connected to said brush; means for supporting said propeller and said brush within said housing between and in alignment with said inlet and outlet nipples, said nipples being in horizontal alignment so that said screen is maintained vertical; and a sediment chamber to one side of said screen to receive the brushings therefrom, said sediment chamber being independent of said inlet nozzle and removable so as to leave an opening in said housing of sufficient size to insert said brush, said propeller, and said supporting means.

3. An automatically cleaned strainer for fluid conduits comprising: a housing; an inlet nipple; an outlet nipple, said inlet and outlet nipples being in alignment with each other at opposite sides of said housing; a screen within said housing in front of said outlet nipple; a brush adapted to brush said screen; a propeller operatively connected to said brush; and means for supporting said propeller and said brush within said housing between and in alignment with said inlet and outlet nipples, said means for supporting comprising: a ring around said screen; arms projecting away from said ring and radially inward; and a bearing supported by said arms substantially on the axial line between said nipples.

In testimony whereof, we affix our signatures.

JESSE A. SLIDER.
BRUCE S. GOODWIN.